United States Patent [19]

Nichols

[11] Patent Number: 4,850,522

[45] Date of Patent: Jul. 25, 1989

[54] STEEL STRIP SPLICING STATION

[75] Inventor: William A. Nichols, Fontana, Calif.

[73] Assignee: California Steel Industries, Inc., Fontana, Calif.

[21] Appl. No.: 208,236

[22] Filed: Jun. 17, 1988

[51] Int. Cl.$^4$ .......................... B23K 9/02; B23K 9/32; B23K 37/04

[52] U.S. Cl. .................................. 228/159; 228/160; 228/5.7; 228/19; 228/49.1; 228/49.4

[58] Field of Search .................. 228/159, 160, 5.7, 19, 228/235, 17, 49.1, 49.4; 29/33 B; 72/203

[56] References Cited

U.S. PATENT DOCUMENTS

| | | | |
|---|---|---|---|
| 3,057,056 | 10/1962 | Foley et al. | 29/33 B |
| 3,394,857 | 7/1968 | Wheeler et al. | 228/5.7 |
| 3,465,118 | 9/1969 | Senn et al. | 228/5.7 |
| 4,721,241 | 1/1988 | Yuasa et al. | 228/5.7 |
| 4,729,502 | 3/1988 | Fukukawa et al. | 228/19 |

Primary Examiner—Kenneth J. Ramsey
Assistant Examiner—Samuel M. Heinrich
Attorney, Agent, or Firm—Christie, Parker & Hale

[57] ABSTRACT

The front of a new steel strip is welded to the tail of a strip being formed in a continuous pipe mill or the like at an improved splice station. The ends of the strips are sheared to match and are clamped on a carriage movable in the longitudinal direction of the strips. A pair of pinch rolls downstream from the carriage for holding the tail of the strip in the mill can be translated in a direction transverse to the strip for aligning the tail with the front of the new strip of metal. Movement of the pinch rolls and carriage bring the ends of the strips into alignment and abutment. An automatic welder on the carriage butt welds the seam between the ends of the strips. A milling cutter traverses across the welded seam for removing excess weld bead to prevent damage to rolls in the forming mill.

16 Claims, 3 Drawing Sheets

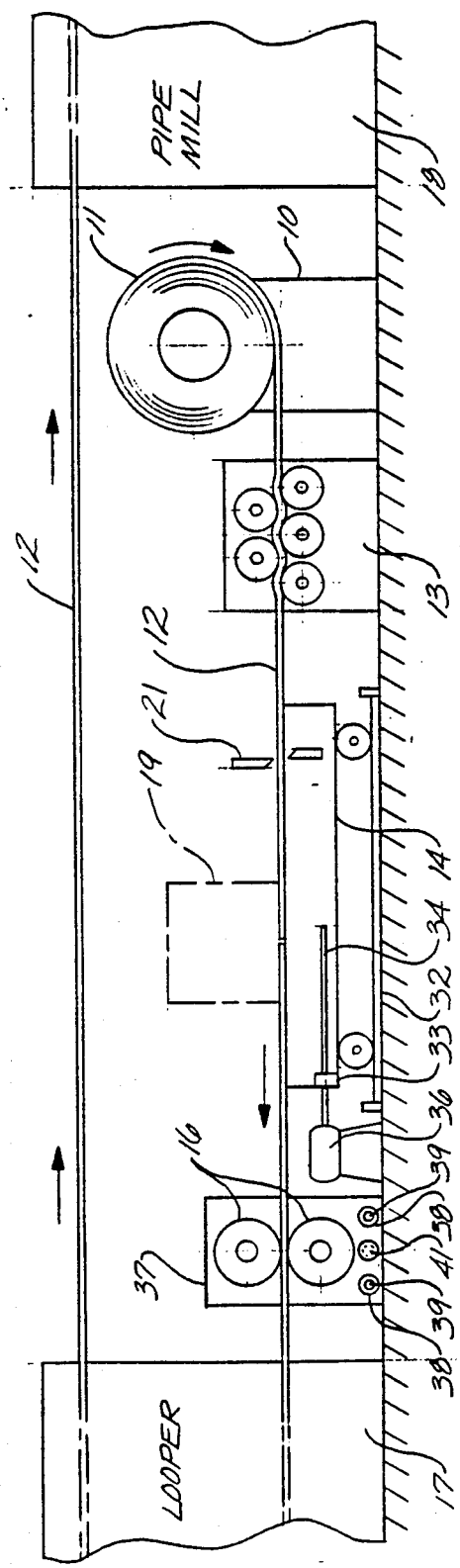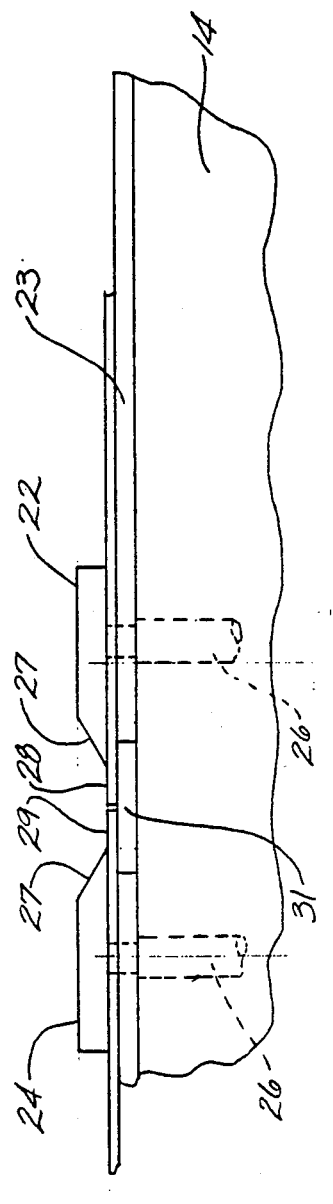

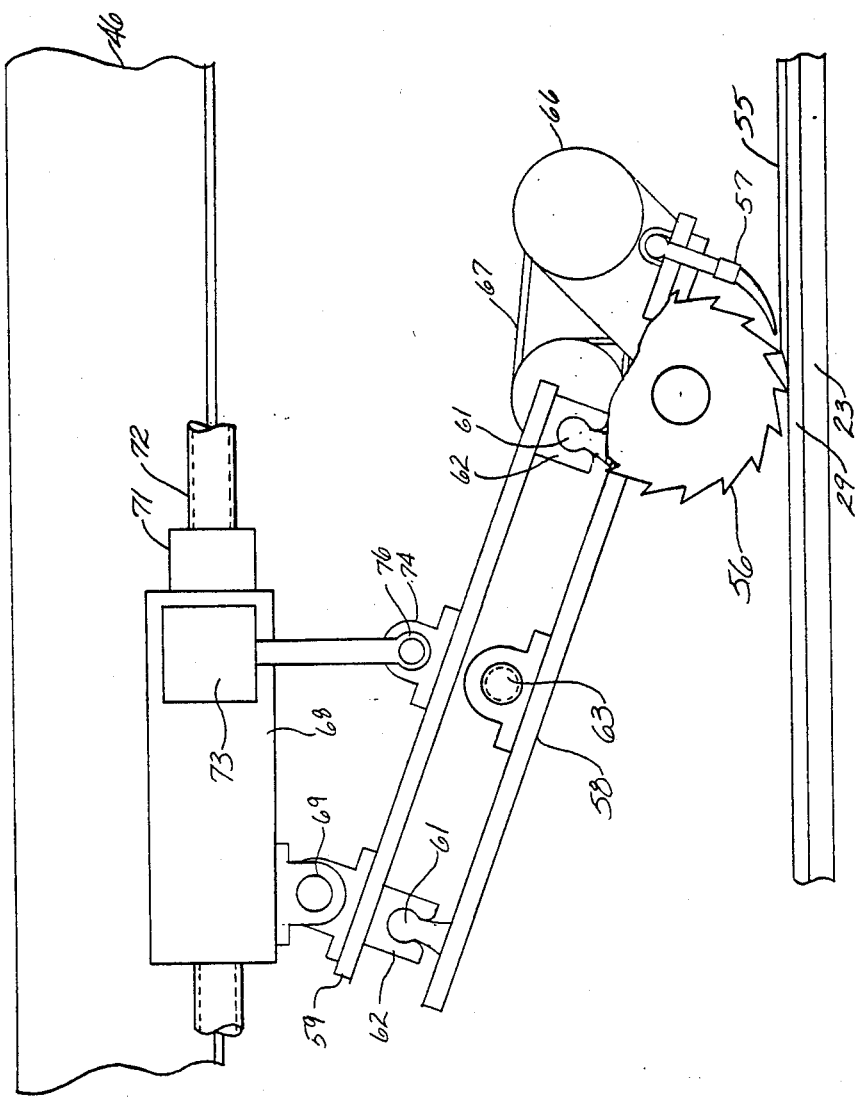

STEEL STRIP SPLICING STATION

BACKGROUND

This invention relates to welding the ends of metal strips together for feed to a continuous forming mill such as a mill for making welded steel pipe or for sheet rolling.

It is common to operate metal forming and similar operations on a continuous basis. For example, steel strip is uncoiled and fed continuously into a pipe mill to produce completed pipe. In such a mill, heavy steel rolls curl the strip of steel around its length to form a closed tube. The longitudinal seam is continuously welded by electrical resistance welding or arc welding to close the pipe. The completed pipe is then cut to convenient lengths. Other forming or coating operations may also be conducted on a continuous basis, commencing with metal strip. For example, the strip may be cold reduced to a desired thickness and/or slit to a desired width, tin plated, galvanized or painted.

The raw material for a continuous mill is ordinarily in the form of a coiled strip which is uncoiled into a "looper", the output of which goes into the forming mill. The length of strip in the looper is sufficient that strip can be continuously withdrawn from the looper into the mill while the input to the looper is stopped for connecting the front of another strip to the tail of a strip that has already entered the looper. A splicing station is provided between the coil and the looper for making such a connection.

A typical splicing station includes a shear for trimming the tail of one strip and the front of the next strip so that they match. Downstream from the shear is a welding station, which may be mounted on a movable carriage for drawing the ends of the two strips together for welding. Downstream from the welding station, that is between the carriage and the looper, there is typically a pair of pinch rolls for gripping the tail of the strip that has already entered the looper.

Side guides are provided for the edges of the strip, and these are typically moved transversely to the sheet length to bring the edges of the two strips into alignment. This may cause damage to the edges of the strips, such as bending or buckling, or upsetting a thickened portion along the edge.

When the strips are properly aligned, the two ends are butt welded together. In conventional practice, this leaves a bead of weld metal at the seam running transverse to the strips. When the welded seam has passed through the looper and passes through the mill, the thick seam of weld metal, and in some cases the battered edges of the strips near the seam, batter the forming rolls. This damages the surface of the rolls and eventually leads to sufficient damage that the rolls must be replaced and reground to produce the desired quality of pipe or strip from the mill.

Thus, it is desirable to minimize damage to the rolls and other structures of the forming mill so that premature replacement is not required. Whatever is done to avoid such damage must be accomplished without interrupting the continuous operation of the mill. In other words, it must be done quickly.

BRIEF SUMMARY OF THE INVENTION

There is, therefore, provided in practice of this invention according to a presently preferred embodiment, a technique for splicing the ends of metal strips which leaves a smooth seam and undamaged strip edges which can pass through forming rolls without damage. This is accomplished in a splice station, much of which is mounted on a carriage that is movable in the longitudinal direction of a strip of metal passing through the splice station. A front clamp on the carriage clamps the advancing front of a strip of metal, and a rear clamp clamps the tail of a strip of metal that has already passed the splice station, defining a welding station between the clamps for butt welding the ends of the strips together. The tail of a strip of metal that has passed the splice station is aligned with the front of an advancing strip of metal by translating the pinch rolls in a direction transverse to the strips, thereby moving the tail of the first strip into alignment with the edges of the next strip to be formed. An automatic welder mounted on the carriage travels transverse to the strips between the clamps for butt welding a transverse seem between the ends of the strips. After welding, a milling cutter mounted on the carriage for travel transverse to the strips, mills excess metal from the weld bead on the transverse seam.

By removing excess metal, the seam between the strips has substantially the same thickness as the strips themselves, and damage to the forming rolls can be avoided. Further, by aligning the ends of the strips by moving the pinch rolls, battering of the edges of the strips is avoided.

DRAWINGS

These and other features and advantages of the present invention will be appreciated as the same becomes better understood by reference to the following detailed description, when considered in connection with the accompanying drawings, wherein:

FIG. 1 is a schematic side view of a continuous forming mill incorporating a splice station constructed according to principles of this invention;

FIG. 2 is a side schematic view of clamps at the welding station of such a splice station;

FIG. 4 is a semi-schematic side view of the milling machine in the splice station, looking in the direction of the length of the strips.

DESCRIPTION

Figure 3:
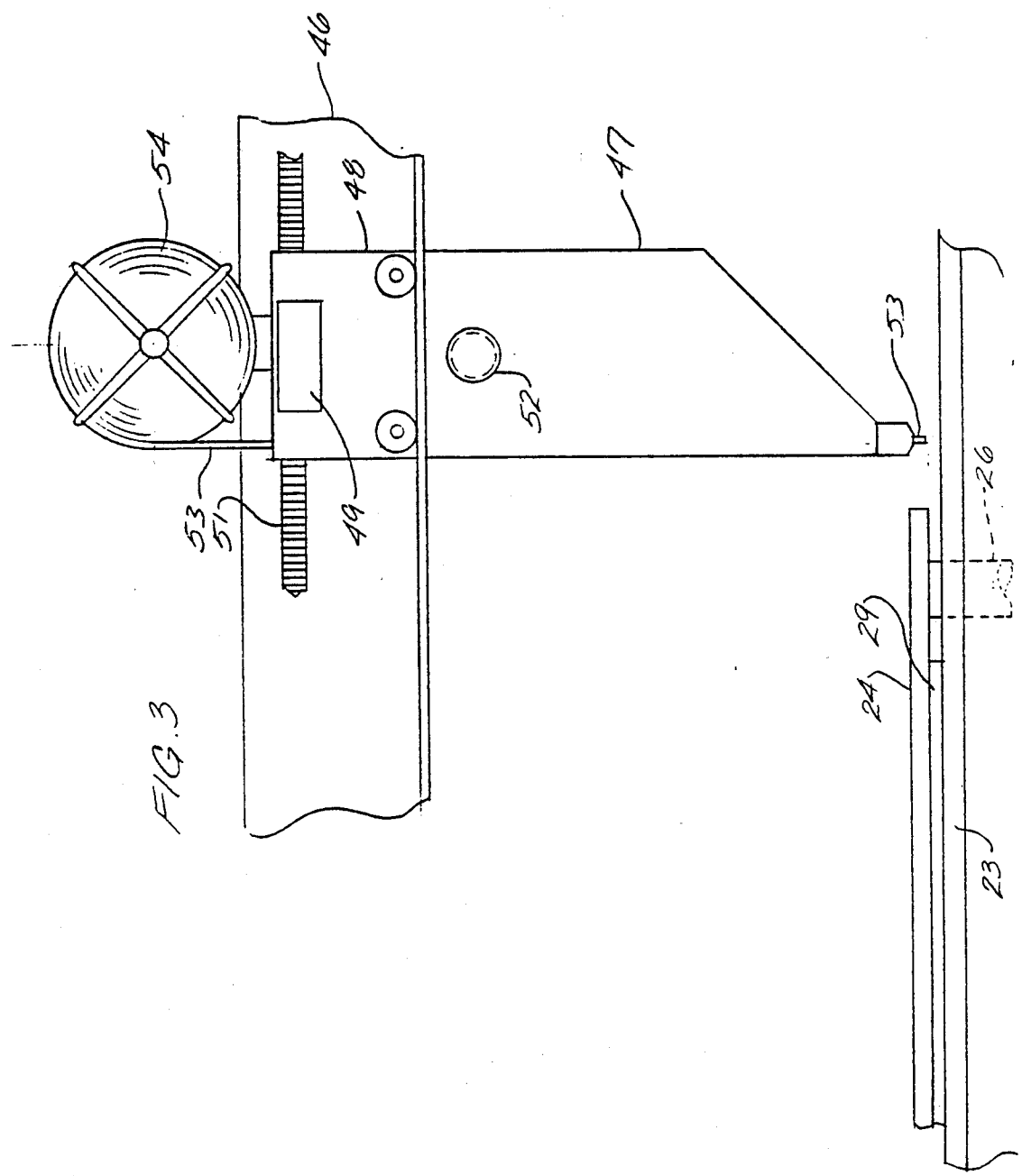
FIG. 3 is a semi-schematic side view of the welding machine in the splice station, looking in the direction of the length of the strips.

In an exemplary arrangement for a forming mill, an uncoiling stand 10, receives a coil of sheet steel 11. The second uncoiling stand commonly used- for changing coils is omitted from the drawing. The steel strip 12, which is drawn with a exaggerated thickness in this schematic illustration, is unwound from the coil, advancing from right to left in the lower part of FIG. 1. Various thicknesses and widths of strips may be used, depending on the final product desired. For example, a strip one-quarter inch thick and 16 inches wide may be a raw material for four-inch pipe, whereas the strips may be one-half inch thick and 54 inches wide for making 16-inch pipe. Although different machine settings may be used for such a diversity of products, the principles of operation are the same.

The uncoiled steel strip passes through a conventional leveler 13, which straightens out the curvature of the strip from the coil. From the leveler, the strip crosses a carriage 14 and through a pair of pinch rolls 16 en route to a conventional looper 17. A typical looper has a long track on which a movable takeup cart can travel. The strip passes along the bed of the looper to the cart, where its direction of travel is reversed, and the strip passes back toward the pipe mill 18 or other forming mill. In a typical embodiment, the strip 12 passes overhead from the looper to the mill. Other means for permitting continuous operation such as looping towers or pits may be used.

The purpose of the looper is to permit continuous withdrawal of strip from the looper as a feed to the mill while the input is stopped. This is important when the steel on a coil runs out, and time is required to splice the front of a new strip of steel to the tail of the strip that is in the looper. Thus, the looper has a sufficient capacity to continuously feed strip to the mill for the entire time required to change coils and make the splice. In a typical embodiment, the looper may contain about 500 feet of strip, allowing seven to ten minutes to splice on a new coil of steel at the rate strip is rolled into pipe.

A welding and milling station 19 indicated in dashed outline in FIG. 1, and further illustrated schematically in the other drawings, is mounted on the carriage 14. A conventional metal shear 21 is mounted near the upstream end of the carriage, that is, the end nearer the coil of steel. A front clamp 22 (FIG. 2) is mounted above the floor 23 of the carriage. Similarly, a rear clamp 24 is mounted above the floor of the carriage downstream from the front clamp. Each of the clamps is in the form of a heavy steel bar extending transverse to the strip direction and having a length greater than the width of the widest strip to be spliced. Each of the clamps is mounted on a pair of hydraulic actuators 26 below the floor of the carriage, one at each end of the respective clamp. The hydraulic actuators can pull each clamp down with a clamping force of 35 tons. Each of the clamps has a tapered edge 27 spaced apart from each other for defining a welding and milling zone between the clamps. When the steel is being withdrawn from the coil continuously, the clamps are raised and the steel strip 12 passes continuously through this zone from the coil toward the pinch rolls.

When the end of a coil is reached, the strip of steel is advanced until its tail is at the shear 21. The end of the tail is sheared off and discarded. Meanwhile, the front end of another coil is fed through the leveler to the shear. Again, the front end is trimmed off and discarded. The front end 28 of the advancing strip from the coil and the tail 29 of the strip in the looper are butted together in the welding and milling zone. An exaggerated space is shown between the ends of the strips in FIGS. 1 and 2 for clarity.

A copper back-up bar 31 is in a gap in the floor 23 of the carriage beneath the welding and milling zone. It will be noted in FIG. 2 that the back-up bar is asymmetrically located with respect to the front and rear clamps 22 and 24. The back-up bar can be subject to damage during welding, and an asymmetrical location is used so that the bar can be turned over and switched from end to end to provide four surface areas that can be used before refinishing is needed.

The movable carriage 14 is used to manipulate the ends of the strips by selective clamping of the ends. About six feet of travel is sufficient for making splices. In a typical operation of the splicing station, the front 28 of an advancing strip of steel from a coil is sheared. The rear clamp is pressed against the sheared tail 29 of a strip in the looper. The carriage is then rolled along a track 32 to draw the tail into abutment with the sheared end of the upstream strip which is essentially fixed by engagement in the leveler. The carriage is moved along the track by a fixed nut 33, which engages a rotatable screw shaft 34 driven by an electric motor 36.

It is also important to align the edges of the new strip from the coil and the previous strip already in the looper. To do this without battering the edges of the strip, the roll stand 37 supporting the pinch rolls 16 is mounted on bearings 38 free to slide on fixed shafts 39 extending transverse to the length of the strips. A fixed nut on the roll stand and motor-driven screw 41 are used to shift the roll stand in a direction transverse to the length of the strip. Thus, the tail of the strip in the looper can be gripped by the pinch rolls and shifted laterally for aligning the edges of the two strips without damage.

When the two strips are abutted and aligned, both clamps can be drawn down to securely hold the ends of the strips in position for welding. The welding and milling station comprises a transverse bridge 46 spanning more than the full width of strips to be spliced. A commercially available wire-feed automatic arc welding machine 47 (FIG. 3) is mounted for rolling across the bridge for making a weld at the seam. The welding machine is mounted on a cart 48 bearing a hydraulic motor 49 which drives a pinion against a rack 51 fixed on the bridge. Preferably, the welding machine is also movable by way of a motor-driven screw 52 in a direction longitudinally along the strips. This permits the welding machine to be moved a small distance upstream or downstream relative to the strips, so that the welding wire 53 is properly aligned with the seam to be spliced.

When a seam is to be welded, the welding machine is traversed to one side of the strips. It is then moved along the seam across the strips at a controlled rate, while an electric arc weld of the butt joint between the ends of the strips is made. The wire fed from a spool 54 atop the welding machine assures adequate weld metal to completely fill the joint formed. The root of the weld is smooth and flat because of the copper back-up bar 31. The upper face of the weld has a raised bead 55 of excess weld metal. It is such a bead of weld metal that may damage the rolls of a forming mill.

Excess metal is removed from the transverse weld bead by a milling cutter 56 on a milling machine (FIG. 4). In an exemplary embodiment, the milling cutter has an eight-inch diameter and a cutting width of one inch. Sixteen cutting tools tipped with cemented tungsten carbide are positioned around the periphery of the milling cutter. With such a cutter rotating at 1,050 rpm, four feet of weld bead can be milled in 30 seconds or less. An air jet nozzle 57 clears chips from the vicinity of the milling cutter.

The milling cutter is mounted on a platform 58, which is in turn connected to a support frame 59. The platform is connected to the frame by bearing ribs 61 engaging support bearings 62 on the frame extending in the direction of the length of the strips. A motor driven screw 63 is used for traversing the milling machine in the longitudinal direction of the strips, so that the center of the milling cutter traverses the seam in alignment with the welder. A hydraulic servo (not shown) automatically keeps the milling cutter in alignment with the welding machine as the latter is moved a small distance to align it with the seam to be formed.

A hydraulic motor 66 is also mounted on the platform for driving the milling cutter by way of one or more geared belts 67.

The milling machine support frame 59 is mounted on a cart 68 by way of a horizontal pivot 69. The cart is mounted for rolling along the bridge 46 for traversing the weld. A fixed nut 71 on the cart is engaged by a motor-driven screw 72 for controlling the rate of traverse of the cart across the bridge.

The vertical position of the support frame 59, and hence, the milling cutter 56 is determined by a hydraulic actuator 73 mounted on the cart. The piston rod of the hydraulic actuator is connected to a pillow block 74 on the support frame by a clevis 76. When the hydraulic actuator is retracted, the milling cutter is pivoted upwardly for clearance above the strips. When the hydraulic actuator is extended, the milling cutter is pivoted down into the correct elevation for milling the excess metal from the weld bead. By using a closed hydraulic system with a mock hydraulic cylinder (not shown) the elevation of the milling cutter can be readily adjusted to mill across the welded seam with an elevation difference from the strip surfaces of twenty mils or less, preferably less than ten mils. It might be noted that some milling into the surface of the strips on each side of the weld bead is preferred, so that there is no protrusion which might damage the rolls of the forming mill. The arrangement using a hydraulic actuator for pivoting the milling cutter into the proper position is desirable since this permits rapid raising and lowering of the milling machine, and accurate positioning of the cutter at the desired elevation.

In a typical implementation of this invention, the controlled positioning and drive of the welder and milling cutter are hydraulic. It will be recognized that, in the schematic drawings, the tubing, connectors and the like for these hydraulic systems have all been omitted, so that the important features of this invention would not be obscured.

Although but one embodiment of a splice station has been described and illustrated schematically herein, it will be understood that various modifications, variations and additions may be employed in practice of this invention. For example, to make a complete weld across the seam between the ends of strips of metal, conventional coupons may be added at the edges of the strips to provide a place for starting and stopping the welding machine. Although it is preferred to employ an automatic wire-feed welder for making a rapid and uniform weld, it will be appreciated that other welding techniques, including manual welding, may be employed if desired.

A variety of techniques may be substituted for mounting and adjusting the apparatus forming the splice station. Further, although described in the context of a continuous pipe mill, principles of this invention are applicable to cold reduction strip mills and various plating and coating lines where presence of a weld bead at the splice between adjacent strips of metal would be detrimental This can be applicable in a mill that is shut down during changing of coils as well as a continuous mill. Laterally movable pinch rolls may be employed for aligning the edges of sheets to spliced in other contacts as well.

Thus, it will be apparent to one skilled in the art that many modifications and variations are feasible, and it is to be understood that, within the scope of the appended claims, the invention may be practiced otherwise than as specifically described.

What is claimed is:

1. A splice station for a continuous metal forming mill comprising:
   a splice station carriage movable in the longitudinal direction of a strip of metal;
   a rear clamp on the carriages for clamping the tail of a first strip of metal that has passed the splice station;
   a front clamp on the carriage for clamping the front of a second strip of metal to the carriage following the first strip of metal;
   a pair of pinch rolls downstream from the carriage for holding the tail of the first strip of metal that has passed the splice station;
   means for translating the pinch rolls in a direction transverse to such a strip of metal for aligning the tail of the first strip of metal that has passed the splice station with the front of the second strip of metal;
   a welder mounted on the carriage for travel transverse to the carriage between the clamps for butt welding a transverse seam between the front of the second strip and a tail of the first strip; and
   a milling cutter mounted on the carriage for travel transverse to the carriage between the clamps for milling excess weld bead from the transverse seam.

2. A splice station as recited in claim 1 further comprising means for moving the milling cutter longitudinally along such a strip of metal for aligning the milling cutter with the seam.

3. A splice station as recited in claim 1 further comprising means for raising and lowering the milling cutter for clearing or engaging the seam.

4. A splice station as recited in claim 3 further comprising means for adjusting the height of the milling cutter for milling only excess metal from the seam.

5. A splice station as recited in claim 3 wherein the means for raising and lowering the milling cutter comprises means for pivoting one end of the milling cutter around a horizontal axis between a raised position clearing the seam and a lowered position for engaging the seam.

6. A splice station as recited in claim 3 further comprising means for moving the milling cutter along the length of the strips for aligning the cutter with the seam.

7. A splice station as recited in claim 1 further comprising a shear mounted on the carriage for receiving and shearing the end of a strip of metal.

8. A splice station for a continuous forming mill comprising:
   a splice station carriage movable in the direction of advance of a strip of metal;
   a rear clamp on the carriage for clamping the tail of a first strip of metal that has passed the splice station;
   a front clamp on the carriage for clamping the front of a second strip of metal to the carriage following the first strip;
   a pair of pinch rolls downstream from the carriage for holding the tail of the first strip of metal that has passed the splice station;
   means for translating the pinch rolls in a direction transverse to such a strip of metal for aligning the tail of the first strip with the front of the second strip; and
   a welder mounted on the carriage for travel transverse to the carriage between the clamps for butt welding a transverse seam between the front of the second strip and the tail of the first strip.

9. A splice station as recited in claim 8 further comprising a milling cutter mounted on the carriage for travel transverse to the carriage between the clamps for milling excess weld bead from the transverse seam, and means for raising and lowering the milling cutter for clearing or engaging the seam.

10. A splice station as recited in claim 9 further comprising means for moving the milling cutter longitudinally along such a strip of metal for aligning the milling cutter with the seam.

11. A splice station as recited in claim 9 further comprising means for adjusting the height of the milling cutter for milling only excess metal from the seam.

12. A splice station as recited in claim 8 further comprising a shear mounted on the carriage for receiving and shearing the end of a strip of metal.

13. A method for splicing the front of a second strip of metal for a continuous forming mill to the tail of a first strip of metal comprising the steps of:
  shearing the tail of the first strip;
  shearing the front of the second strip;
  drawing the tail of the first strip against the front of the second strip for defining a transverse seam;
  gripping the tail of the first strip between a pair of pinch rolls;
  shifting the pinch rolls laterally for aligning the edges of the first strip with the edges of the second strip; and
  butt welding the seam between the front of the second strip and the tail of the first strip.

14. A method as recited in claim 13 further comprising the step of milling excess weld bead from the welded seam.

15. A method as recited in claim 13 wherein the drawing step comprises:
  clamping the tail of the first strip on a longitudinally movable carriage;
  moving the carriage for drawing the strips together; and
  clamping the front of the second strip adjacent to the tail of the first strip.

16. A method as recited in claim 15 comprising seriatim: releasing the clamping of the tail of the first strip after drawing the strips together, shifting the pinch rolls, and reclamping the tail of the first strip before welding.

* * * * *